(12) United States Patent
Gonzato

(10) Patent No.: US 12,292,069 B2
(45) Date of Patent: May 6, 2025

(54) CLAMP FOR THE COMPOSITION OF A TECHNICAL STRUCTURE FOR FURNITURE, PROTECTION AND/OR DELIMITATION

(71) Applicant: IND.I.A. S.P.A., Malo (IT)

(72) Inventor: Davide Gonzato, Malo (IT)

(73) Assignee: IND.I.A. S.P.A., Malo (IT)

( * ) Notice: Subject to any disclaimer, the term of this patent is extended or adjusted under 35 U.S.C. 154(b) by 0 days.

(21) Appl. No.: 18/503,426

(22) Filed: Nov. 7, 2023

(65) Prior Publication Data

US 2024/0151253 A1    May 9, 2024

(30) Foreign Application Priority Data

Nov. 8, 2022   (IT) .......................... 102022000022995

(51) Int. Cl.
*F16B 2/12*         (2006.01)
(52) U.S. Cl.
CPC ..................................... *F16B 2/12* (2013.01)
(58) Field of Classification Search
CPC ........ F16B 2/12; F16B 5/0664; E04F 11/1817
See application file for complete search history.

(56) References Cited

U.S. PATENT DOCUMENTS

| | | | | |
|---|---|---|---|---|
| 4,487,205 A | * | 12/1984 | Di Giovanni | A61B 17/122 251/10 |
| 4,822,348 A | * | 4/1989 | Casey | A61F 6/206 606/157 |
| 8,328,457 B2 | * | 12/2012 | Werth | A61M 39/1011 403/313 |
| 10,330,249 B1 | * | 6/2019 | Polen | F16B 2/10 |
| 10,729,448 B2 | * | 8/2020 | Patel | A61B 17/122 |
| 2007/0137882 A1 | * | 6/2007 | Journeaux | H02G 3/32 174/135 |
| 2012/0083803 A1 | * | 4/2012 | Patel | A61B 17/1285 606/157 |
| 2013/0333167 A1 | * | 12/2013 | Wu | G03B 17/561 24/517 |

FOREIGN PATENT DOCUMENTS

EP       3786387 A1    3/2021
WO    2022153083 A1    7/2022

* cited by examiner

*Primary Examiner* — David M Upchurch
(74) *Attorney, Agent, or Firm* — INNOVATION CAPITAL LAW GROUP, LLP; Vic Lin

(57) ABSTRACT

A clamp (10) for the composition of a technical structure for furniture, protection and/or delimitation provided with vertical elements, the clamp (10) includes an upper jaw (1), a lower jaw (2) and a locking system (3) fixed to said upper jaw (1). The locking system (3) includes thrust means (33) and at least one pin (32). The lower jaw (2) has at least one hole (7) in a position corresponding to at least one pin (32) adapted to be inserted into said at least one hole (7) when the thrust means (33) are in an extended position, in order to lock and close the clamp (10).

5 Claims, 4 Drawing Sheets

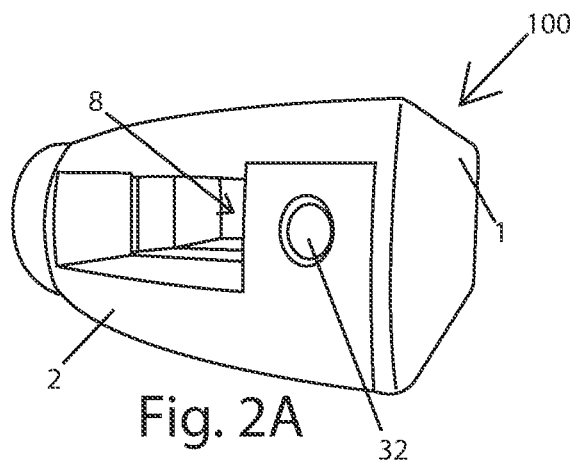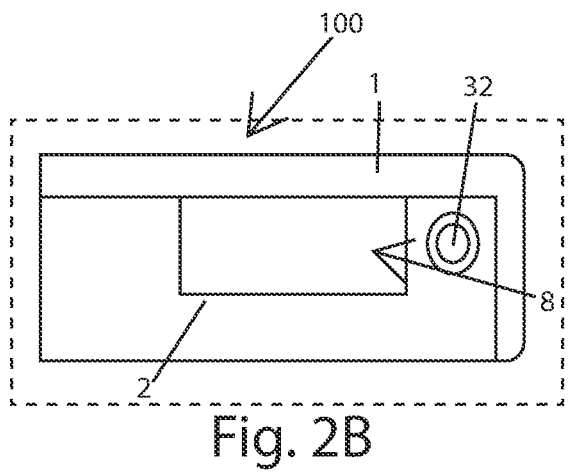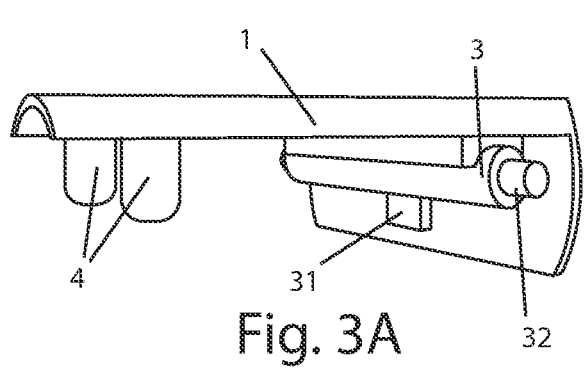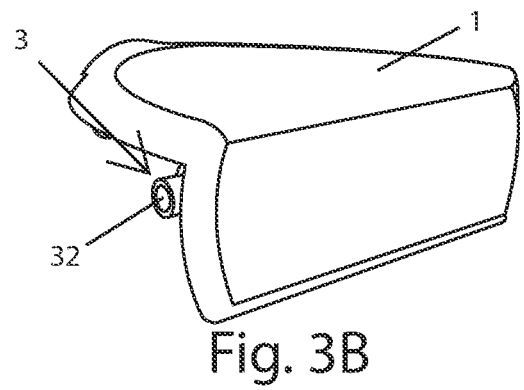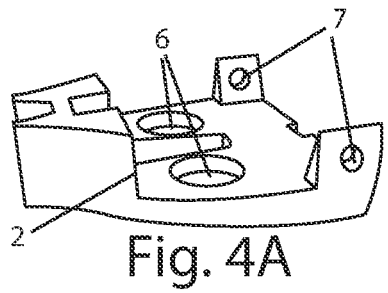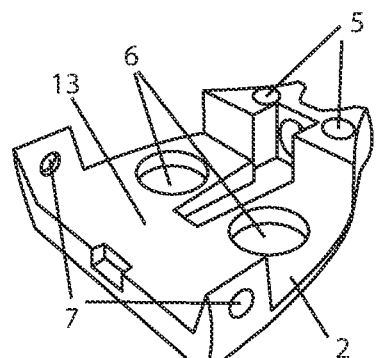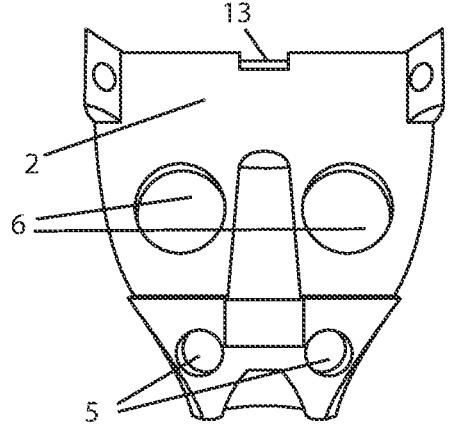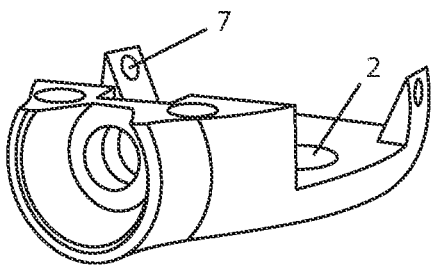

CLAMP FOR THE COMPOSITION OF A TECHNICAL STRUCTURE FOR FURNITURE, PROTECTION AND/OR DELIMITATION

BACKGROUND OF THE INVENTION

The present invention concerns an improved clamp, for universal use, for the composition of technical structures for furniture, protection and/or delimitation.

The invention falls within the technical field of the modular clamps, for universal use, for the composition of technical structures such as for example paneling, partition walls, parapets, stair railings, facade systems, sunshades or shelters, installed in environments or buildings of various types.

The above-mentioned clamps are fixed to uprights or load-bearing columns which, generally, identify vertical directions and quadrilateral or circular sections of the technical structure.

In the event that the clamps are coupled to intermediate and internal uprights of the technical structure, they are housed in predetermined portions of the perimeter edge of internal barriers adjacent to each other and side by side which contribute to form the technical structure itself.

The clamps fixed to the end uprights are housed in predetermined portions of the perimeter edge of the terminal barrier only.

In particular, the most widespread conventional construction form nowadays involves applying a plurality of clamps, generally two clamps per upright, one in the upper part and one in the lower part, guaranteeing four anchoring points to the load-bearing structural elements for each barrier.

More in detail, each known type of clamp, intended for the use considered, is firmly coupled to a load-bearing structural element, such as for example an upright or a column, of the technical structure.

The known clamps also include a pair of associated shaped jaws, arranged opposite each other, facing each other and spaced so as to identify at least a seat communicating with the outside and adapted to receive a perimeter portion of a barrier or an upright clamped between the jaws themselves and belonging to the technical structure.

By combining the barriers, uprights and clamps in this way, the installer is able to set up a technical structure for furniture, delimitation and/or protection, provided with a high rigidity.

However, the just briefly described clamps of known type, intended to compose a technical structure for furniture, protection and/or delimitation, present some drawbacks.

The main drawback of the known technique in question is that the clamps needed correspond to the thicknesses of the barrier to be coupled to the load-bearing structural elements such as the uprights or columns.

The range of clamps currently produced to effectively satisfy every specific and different need linked to the various thicknesses of the barrier, in fact, is quite wide and does not even minimally achieve the modularity of manufacturing, management and supply desirable for such items.

In fact, it should be noted that the barriers available on the market and which can be coupled by clamps to load-bearing structural elements, in order to form the technical structures considered, have various thicknesses.

Therefore, precisely to allow the installer to use appropriate clamps based on the thickness of the barrier used, manufacturers make available a large number of clamps which differ from each other in the shape and size of the elements that compose them.

When, for any reason, it is necessary to change the thickness of the barrier or at least to apply, even at the same time in the same technical structure, barriers of different thicknesses, it will be necessary to change the type of clamping clamps.

This is imposed by the construction concept of the clamps, focused on providing the coupling of two jaws in a single body clamping the barrier.

The current situation, whereby there are as many clamps as the thicknesses of the barriers of the technical structure, on the one hand essentially prevents the standardization of production, with consequent loss of production efficiency, but on the other hand causes a proliferation of finished items and corresponding item codes, with a consequent increase in the complexity of managing the finished products warehouse.

A further drawback of the prior art clamps is that these clamps include, for their fixing, screws which, in addition to lower the aesthetic appeal of the clamp, can cause inconveniences in case of fixing or removal thereof when the clamp is placed in places that are not easily accessible for installers.

Finally, a final drawback is linked to the safety of the clamps as the screws, due to wear, strong temperature variations or other factors, could unscrew, decreasing their locking force.

The current invention intends to overcome the just mentioned drawbacks of the state of the art.

In particular, the aim of the invention is to conceive an improved clamp for the composition of technical structures for furniture, protection and/or delimitation that can be produced with a greater degree of standardization compared to the known technique, when the thickness of the barrier, which is to be coupled to load-bearing structural elements via the clamp itself, varies.

In other words, the aim of the invention is to allow a barrier of any material and thickness to be applied to load-bearing structural elements without the need to completely change the type of clamp suitable for the purpose, as currently happens.

Within this aim, it is an objective of the current invention to increase, compared to the prior art, the production efficiency linked to the manufacture of clamps for the composition of technical structures for furniture, protection and/or delimitation.

Another aim of the present invention is to provide an improved clamp for the composition of technical structures for furniture, protection and/or delimitation, which can be installed more quickly and easily.

Another aim of the present invention is to provide an improved clamp for the composition of technical structures for furniture, protection and/or delimitation with a simple snap closing/opening system.

A further aim of the present invention is to create an improved clamp for the composition of technical structures for furniture, protection and/or delimitation which has enhanced safety features due to the locking system that opens through simultaneous pressing and without screws.

Another aim of the present invention is to provide an improved clamp for the composition of technical structures for furniture, protection and/or delimitation with an improved aesthetic appeal due to the absence of visible screws.

Finally, a final aim of the present invention is to provide an improved clamp for the composition of technical structures for furniture, protection and/or delimitation that are simple, easy and economical to manufacture.

These and other aims are achieved by an improved clamp for the composition of technical structures for furniture, protection and/or delimitation according to the attached independent claims.

SUMMARY OF THE INVENTION

The object of the present invention is therefore a clamp for the composition of a technical structure for furniture, protection and/or delimitation provided with vertical elements and comprising an upper jaw, a lower jaw and a locking system fixed to said upper jaw which includes thrust means and at least one pin, the lower jaw has at least one hole in a position corresponding to at least one pin adapted to be inserted into at least one hole when the thrust means are in an extended position, so as to lock and close the clamp.

Optionally, the upper jaw includes a lower end protruding from the locking system adapted to be engaged in a section of the lower jaw so as to lock the clamp.

In a preferred form, the jaws have in their central portion a seat adapted to house a part of the vertical elements of the structure.

In a further preferred form, the upper jaw includes projecting portions configured to be received in said corresponding seats of the lower jaw to increase the stability and fastening of the clamps.

Furthermore, the lower jaw has a plurality of housings configured to contain friction elements, for example gaskets, to prevent the fixed elements from moving and sliding.

In a preferred form, the thrust means comprise a spring provided with two ends and two pins fixed to the ends of said spring.

Further detailed technical features are set out in the attached dependent claims.

BRIEF DESCRIPTION OF THE DRAWINGS

The present invention will now be described, by way of non-limiting example, according to some of its preferred embodiments, and with the aid of the attached figures, in which:

FIG. 2A is a perspective view of the clamp according to the invention;

FIG. 2B is a side view of the clamp according to the invention;

FIGS. 3A and 3B are two perspective views of the upper jaw of the clamp according to the invention;

FIGS. 4A, 4B, 4D are a set of perspective views, from different angles, of the lower jaw of the clamp according to the invention;

FIG. 4C is a top view of the lower jaw of the clamp according to the invention;

DETAILED DESCRIPTION OF THE PREFERRED EMBODIMENTS

Figure 1A:
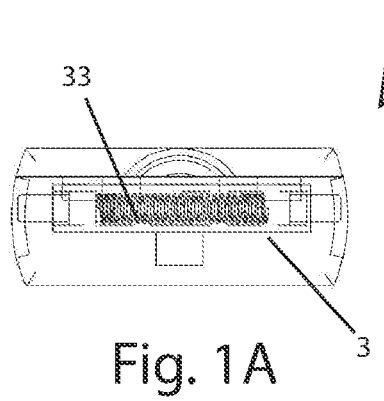
FIG. 1A is a schematic representation of the clamp according to the invention, in a front view.
Figure 1B:
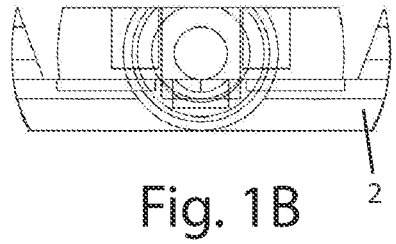
FIG. 1B is a schematic representation of the lower jaw of the clamp of FIG. 1A, in a front view.
Figure 1C:
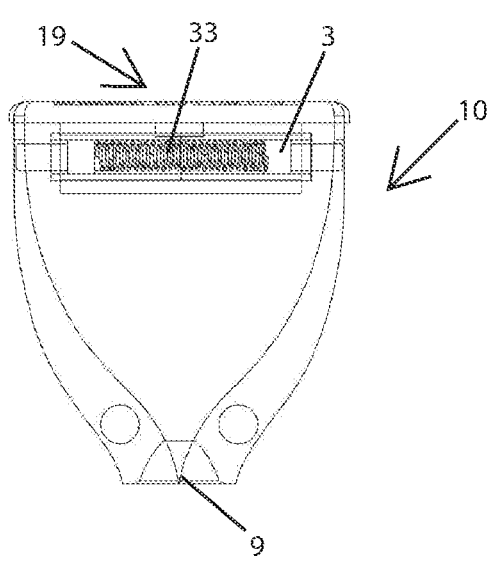
FIG. 1C is a schematic representation seen from above of the clamp of FIG. 1A.
Figure 1D:
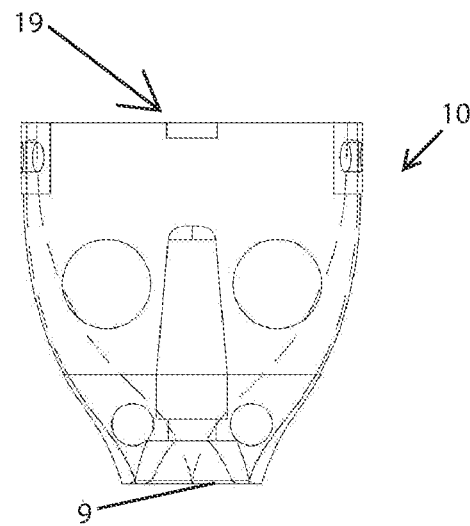
FIG. 1D is a schematic representation seen from below of the clamp of FIG. 1A.
Figure 1E:
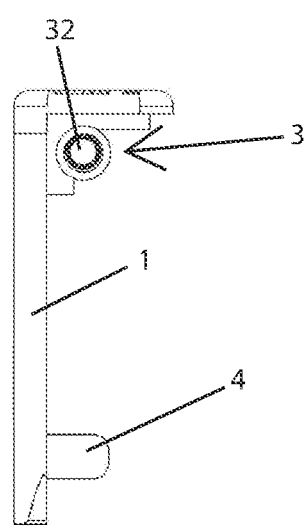
FIG. 1E is a schematic representation of the upper jaw of the clamp of FIG. 1A, seen laterally.
Figure 1F:
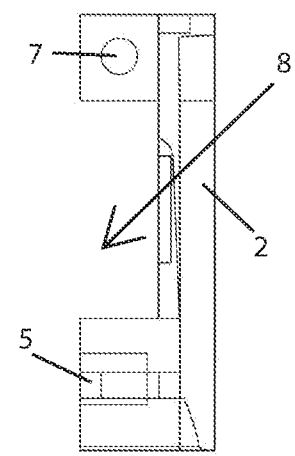
FIG. 1F is a schematic representation of the lower jaw of the clamp of FIG. 1A, seen laterally.
Figure 5:
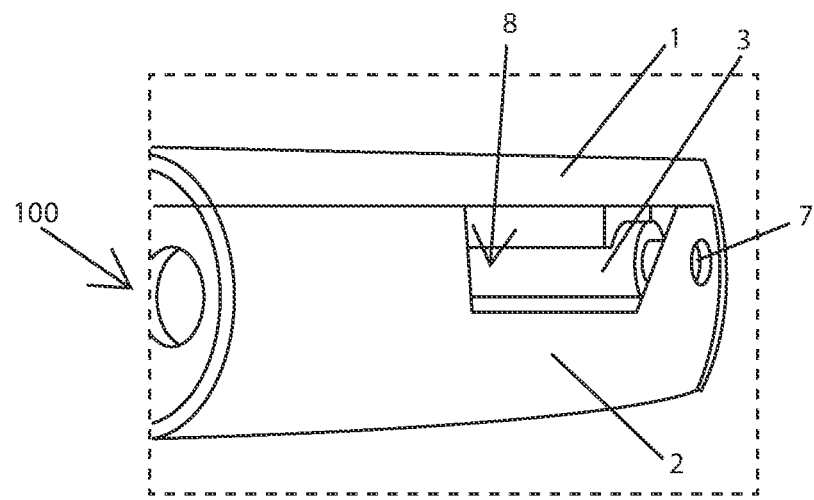
FIG. 5 is a detail of the system of coupling between the upper jaw and the lower jaw of the clamp according to the invention.
Figure 6A:
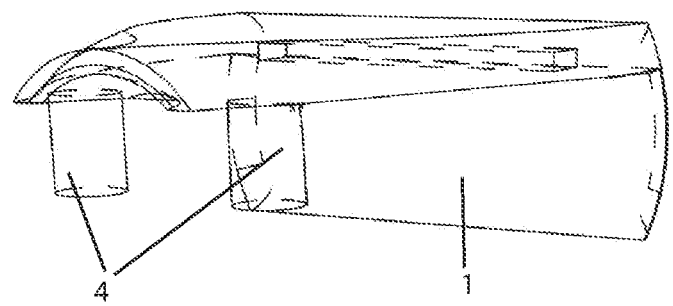
FIGS. 6A and 6B are two schematic representations of the upper and lower jaws of the clamp according to the invention.
Figure 6B:
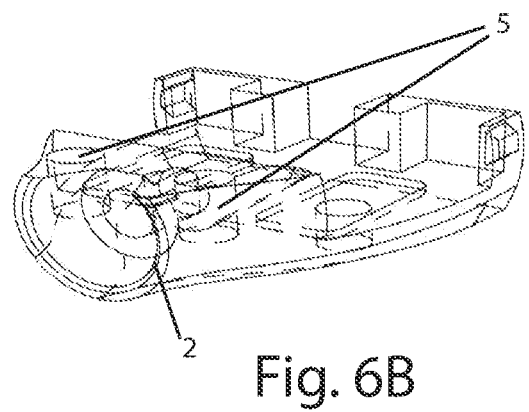
Figures 7A, 7B:
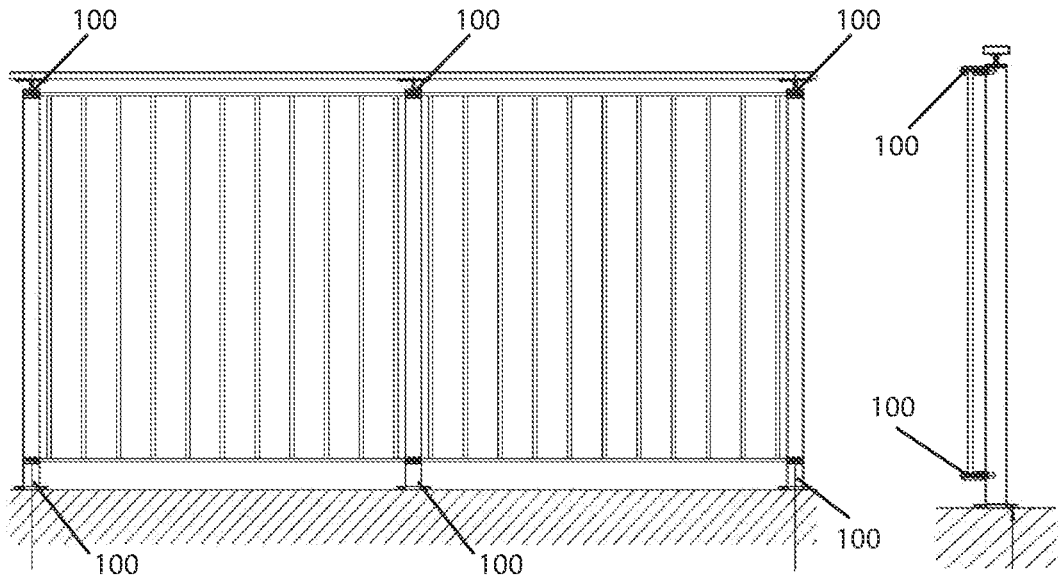
FIG. 7A is a front view of a parapet or railing, in a first embodiment, on which a plurality of clamps is applied, according to the invention.
FIG. 7B is a side view of the parapet or railing of FIG. 7A.
Figures 8A, 8B:
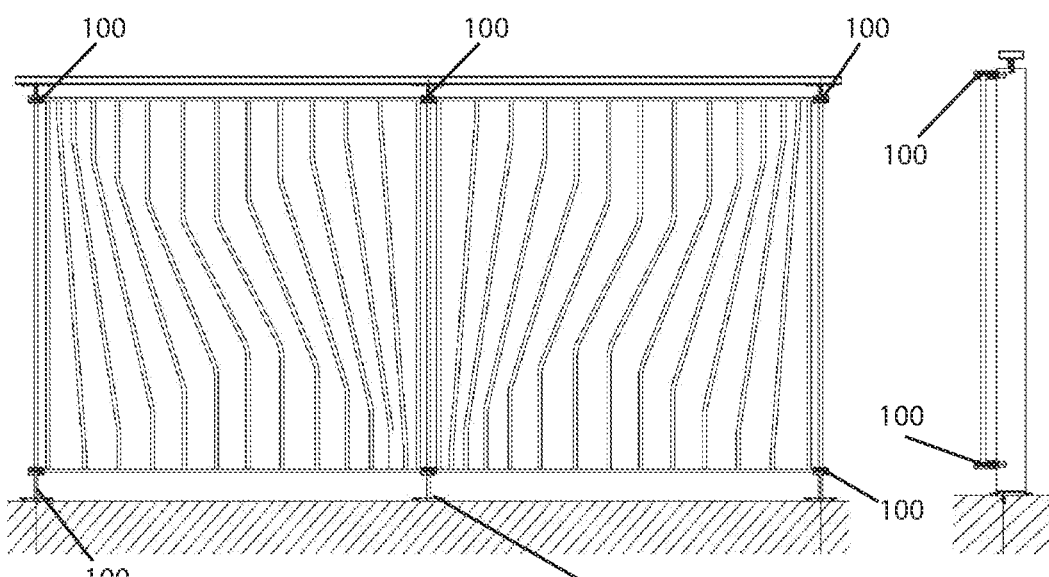
FIG. 8A is a front view of a parapet or railing, in a second embodiment, on which a plurality of clamps is applied, according to the invention.
FIG. 8B is a side view of the parapet or railing of FIG. 8A.

With reference to the figures, a preferred embodiment of the improved clamp for the composition of technical structures for furniture, protection and/or delimitation according to the invention is represented.

The improved clamp 10 is adapted to compose a technical structure for furniture, protection and/or delimitation, which is not shown in the attached drawings for the sake of simplicity and consisting for example of a stair railing or a dividing wall of a room, comprising load-bearing structural elements, or uprights or columns, having a regular profile.

Referring to the above figures, the improved clamp for the composition of technical structures for furniture, protection and/or delimitation are indicated with the numerical reference 10 and, in a first embodiment, according to the present invention, includes an upper jaw 1, a lower jaw 2 and a locking system 3.

In particular, the upper jaw 1 includes two projecting portions 4, intended to be received in corresponding seats 5 included in the lower jaw 2.

Advantageously, the coupling between the projecting portions 4 and the seats 5 increases the stability and fastening of the clamp 10.

The clamp 10 includes, at one end, a junction area 9 for coupling the clamp 10 to a structural or support element such as an upright or a column.

The jaws 1, 2 are made to advantageously receive ends of different sections and sizes; the jaws 1, 2 themselves are however capable of firmly locking these different ends in position thanks to the locking and interlocking systems which will be described later.

Advantageously, the clamp 10 can also be positioned directly on a wall, through its junction area 9, through a simple integration of accessories and/or through the choice of appropriate fixing means, without compromising the reliability and simplicity of use of the invention.

The clamp 10 presents an increasing variation in width starting from the junction area 9 up to a front surface 19 positioned at the end opposite to the junction area 9.

In the substantially central portion of the jaws 1 and 2 of the clamp 10 there is a seat 8, used to house one end or in any case a part of the uprights or columns of the structure.

Advantageously, the clamp 10 is able to receive and support the ends of up to two uprights or columns of two respective adjacent panels, which are received in the space existing between the two jaws 1, 2.

In an equally efficient manner it is also possible to house the horizontal portion of an upright of the structure so that it passes through and slides inside the seat 8; this allows greater flexibility in the installation procedure, being able to provide support even to longer sections of parapets or fences, and providing the possibility of varying the position of the individual panels even after having installed them.

The locking system 3 is fixed to the upper jaw 1 and is configured to be inserted, with a lower end 31 and with two pins 32, into the lower jaw 2.

In particular, the lower end 31 protrudes from the locking system 3 and is intended to be engaged in an appropriate section 13 of the jaw 2.

The pins 32, instead, are designed for being engaged in appropriate circular holes 7.

Advantageously, the locking system 3 is of the snap type and comprises inside it a spring or an elastic element 33 connected to the pins 32.

Operationally, when the pins 32 are pressed, the spring 33 inside the system 3 contracts and vice versa when the pins 32 are released, the spring 33 extends until it reaches a condition of rest or maximum extension. In this condition, the pins 32 are completely inserted into the appropriate holes 7, locking the clamp 10 and preventing the detachment of the lower jaw 2 from the upper jaw 1.

Advantageously, the pins 32 reduce the time required and make it easier to open the clamp 10.

Furthermore, since the locking system 3 does not rely on any type of screw for opening or closing the clamp 10, it allows greater speed and convenience of installation for installers.

In particular, an operator who must install or remove the clamp 10 will only have to act on the locking system without carrying out screwing or unscrewing operations which can be difficult and uncomfortable in the case of areas that are difficult to reach or close to edges.

Even more advantageously, since the locking mechanism 3 does not rely on any screw, it enhances the safety of the clamp 10 because the only way to open the clamp 10 is to act simultaneously on both pins 32 which fix the upper jaw 1 to the lower jaw 2.

To act simultaneously on both pins 32 it is necessary to use an appropriate tool (not shown) capable of being inserted into the holes 7 and of pressing on the pins 32 which, by compressing the spring, come out of the holes 7 allowing the clamp 10 to be opened.

Advantageously, the clamp 10 guarantees a considerable aesthetic improvement because the jaws 1, 2 do not include any visible screw or fastening element.

In particular, this advantage is of considerable importance in all those areas wherein the clamp 10 is applied to furniture elements or with aesthetic functions.

Again advantageously, to increase the tightness of the clamp 10, friction elements, for example gaskets (not shown), are present inside the clamp.

In particular, these gaskets are positioned in housings 6 obtained in the internal face of the jaw 2.

More in detail, these gaskets, for example of the bon-bon type, keep the clamp 10 under pressure, preventing the jaws 1 and 2 from horizontally sliding and thus preventing the jaws 1 and 2 from moving.

The invention thus conceived and illustrated here is susceptible to numerous modifications and variations, all falling within the scope of the inventive concept.

Furthermore, all details may be replaced by other technically equivalent elements.

Finally, the components used, as long as they are compatible with the specific use, as well as the sizes, may be any according to the needs and the state of the art.

Where the features and techniques mentioned in any claims are followed by reference signs, such reference signs have been included with the sole aim of increasing the intelligibility of the claims and, accordingly, such reference signs have no limiting effect on the interpretation of each element identified by way of example by these reference signs.

The invention claimed is:

1. A clamp (10) for the composition of a technical structure for furniture, protection and/or delimitation provided with vertical elements, said clamp (10) comprising an upper jaw (1), a lower jaw (2) and a locking system (3) fixed to said upper jaw (1), said clamp (10) being characterized in that said locking system (3) comprises thrust means (33) and at least one pin (32), and in that said lower jaw (2) has at least one hole (7) in a position corresponding to said at least one pin (32), said at least one pin (32) being adapted to be inserted into said at least one hole (7) when said thrust means (33) are in an extended position, in order to lock and close said clamp (10), wherein said thrust means (33) comprise a spring having two ends and in that said at least one pin (32) comprises two pins attached to the ends of said spring.

2. The clamp (10) as claimed in claim 1 characterized in that said upper jaw (1) comprises a lower end (31) protruding from said locking system (3) and in that said lower jaw (2) has an appropriate section (13) in a position corresponding to said lower end (31), said lower end (31) being adapted to be engaged in said section (13) so as to lock said clamp (10).

3. The clamp (10) as claimed in claim 1 characterized in that said jaws (1, 2) have in their central portion a seat (8), adapted to house part of the vertical elements of the structure.

4. The clamp (10) as claimed in claim 1 characterized in that said upper jaw (1) comprises projecting portions (4) and in that said lower jaw (2) has corresponding seats (5), said projecting portions (4) being configured to be housed in said corresponding seats (5) so as to increase the stability and fastening of said clamp (10).

5. The clamp (10) as claimed in claim 1 characterized in that said lower jaw (2) has a plurality of housings (6) configured to contain friction elements so as to prevent said vertical elements from moving and/or sliding relative to said jaws (1,2).

* * * * *